(12) United States Patent
Lin et al.

(10) Patent No.: US 9,109,946 B2
(45) Date of Patent: Aug. 18, 2015

(54) INFRARED THERMOMETER

(75) Inventors: Wen-Teng Lin, Taipei (TW); Gerhard Frick, Feldkirch (AT)

(73) Assignee: Microlife Intellectual Property GMBH, Widnau (CH)

( * ) Notice: Subject to any disclaimer, the term of this patent is extended or adjusted under 35 U.S.C. 154(b) by 611 days.

(21) Appl. No.: 13/496,128

(22) PCT Filed: Sep. 7, 2010

(86) PCT No.: PCT/EP2010/063106
§ 371 (c)(1),
(2), (4) Date: Mar. 14, 2012

(87) PCT Pub. No.: WO2011/032864
PCT Pub. Date: Mar. 24, 2011

(65) Prior Publication Data
US 2012/0177083 A1    Jul. 12, 2012

(30) Foreign Application Priority Data
Sep. 16, 2009 (EP) .................................... 09170437

(51) Int. Cl.
*G01J 5/00*  (2006.01)
*G01J 5/02*  (2006.01)
*G01J 5/04*  (2006.01)
*G01J 5/08*  (2006.01)

(52) U.S. Cl.
CPC .................. *G01J 5/02* (2013.01); *G01J 5/0022* (2013.01); *G01J 5/0025* (2013.01); *G01J 5/026* (2013.01); *G01J 5/04* (2013.01); *G01J 5/049* (2013.01); *G01J 5/08* (2013.01); *G01J 5/0846* (2013.01)

(58) Field of Classification Search
CPC ........................................................ G01J 5/049
USPC ........... 374/120, 130–131, 208; 600/549, 474
See application file for complete search history.

(56) References Cited

U.S. PATENT DOCUMENTS

| 6,358,216 | B1 * | 3/2002 | Kraus et al. .................... 600/549 |
| 6,626,568 | B2 * | 9/2003 | Sato et al. ...................... 374/121 |
| 6,896,675 | B2 * | 5/2005 | Leung et al. ..................... 606/49 |
| 7,048,756 | B2 * | 5/2006 | Eggers et al. .................. 607/113 |
| 7,378,975 | B1 * | 5/2008 | Smith et al. ................. 340/573.1 |
| 8,306,774 | B2 * | 11/2012 | Quinn et al. ................... 702/135 |

(Continued)

FOREIGN PATENT DOCUMENTS

| DE | 19827343 | 12/1999 |
| DE | 19929503 | 1/2001 |
| DE | 202004003021 | 6/2004 |

(Continued)

OTHER PUBLICATIONS

International Search Report for international application No. PCT/EP2010/063106, dated Oct. 5, 2010 (4 pages).

*Primary Examiner* — Lisa Caputo
*Assistant Examiner* — Nasir U Ahmed
(74) *Attorney, Agent, or Firm* — Hamre, Schumann, Mueller & Larson, P.C.

(57) ABSTRACT

One aspect of the present invention is an infrared thermometer with an infrared sensor. The infrared thermometer is adapted for determining a temperature on at least one predetermined spot on or in a human or animal body and further comprises recognition means for recognizing if the sensor is properly positioned on said at least one predetermined spot. Further shown is a method of operating an infrared thermometer.

12 Claims, 6 Drawing Sheets

(56) References Cited

U.S. PATENT DOCUMENTS

| | | |
|---|---|---|
| 2003/0099277 A1 | 5/2003 | Bellifemine |
| 2004/0233968 A1* | 11/2004 | Tabata et al. .................. 374/121 |
| 2007/0055171 A1* | 3/2007 | Fraden .......................... 600/549 |
| 2007/0242726 A1* | 10/2007 | Medero ......................... 374/164 |
| 2007/0291820 A1 | 12/2007 | Yang et al. |
| 2008/0246625 A1 | 10/2008 | Chen et al. |

FOREIGN PATENT DOCUMENTS

| | | |
|---|---|---|
| EP | 1162439 | 12/2001 |
| EP | 1271119 | 1/2003 |
| JP | 9-5167 | 1/1997 |

* cited by examiner

INFRARED THERMOMETER

The present invention relates to infrared thermometers with infrared sensors and adapted for measuring the temperature on at least one predetermined spot on or in a human or animal body and to a method of operating an infrared thermometer.

BACKGROUND OF THE INVENTION

Temperature of humans or animals can be taken at different spots on the body, for example the mouth, the rectum, armpit or the eardrum, more precisely the external auditory canal. More recently, methods have been developed that allow for accurate measurement of temperature on the skin with infrared thermometers, more particularly on the forehead or the temples. This has been proven advantageous and uncomplicated in use, especially in regard to infant care.

Infrared thermometers are basically non-contact thermometers that are equipped to guide infrared energy on to a detector, which converts the energy to an electrical signal that can be displayed in units of temperature after being compensated for ambient temperature variation.

Devices for performing a temperature measurement are available for the medical professional and home use. One example for such a device is described in DE19929503 A1. This document describes a device that can be used in a plurality of locations by using different detector heads depending on the measurement location. The document provides a detector head suitable for use in the ear and a detector head for application on the patient's forehead or temples. The application of the correct cap ensures that the temperature calculation from the measurement is performed correctly, i.e. that the right algorithm is chosen depending on the location.

It is a drawback of this thermometer that the measuring head may be lost or that it may be difficult for inexperienced users to place the head.

EP1271119 A1 provides a method for mitigating the risk of handling errors in performing the measurement. The document shows an infrared clinical ear thermometer that has means for detecting an insertion condition of the probe into the external ear canal. Measurement is permitted, once said means determine that the probe is sufficiently inserted. The means for determining sufficient insertions rely on first preliminary temperature measurements.

It is an object of the present invention, to solve the problems of the prior art. It is particularly an object to provide a reliable, easy to manufacture, infrared thermometer which can perform accurate temperature measurements on various locations and which can be easily and reliably used by all users. This object is solved with an infrared thermometer according to the independent claims.

SUMMARY OF THE INVENTION

One aspect of the present invention is an infrared thermometer with an infrared sensor. The infrared thermometer is adapted for determining a temperature on at least one predetermined spot on or in a human or animal body and further comprises recognition means for recognizing if the sensor is properly positioned on said at least one predetermined spot.

The infrared thermometer includes a detector, e.g. a thermopile, which converts the energy to an electrical signal that can be displayed in units of temperature after being compensated for ambient temperature variation. The infrared thermometer is further equipped with a microprocessor for performing calculations and/or for controlling the various functions of the infrared thermometer and with a memory for storing either algorithms relating to a temperature measurement on any one of the predetermined spots, or measurement data.

In a preferred embodiment, the infrared thermometer is adapted to recognize proper position at a plurality of different predetermined spots. Predetermined spots according to the invention can be any spots where temperature can successfully be taken, preferably such spots where temperature is frequently and reliably taken. The infrared thermometer can be adapted for determining a temperature on, for example, the forehead, in the external auditory canal, the armpit, the oral cavity and/or the rectum.

According to the present invention, adapted for determining the temperature means that the device is able to measure an actual temperature over a certain time interval which results in a temperature curve and calculate with said temperature curve a body temperature. For clinical purposes the externally measured temperature should be calculated to core body temperature, which is the effective operating temperature of a human or animal.

In the context of the present invention a recognition means is to be understood as a means for determining on the basis of a physical measurement if the thermometer is being applied on a predetermined spot.

In the context of the present invention, an infrared thermometer is brought into proper position with a spot when sufficiently close to a spot to enable measurement. For temperature measurement on the temples or forehead, for example, the thermometer can be rested or moved along on the surface of the skin while measuring. The thermometer can be further equipped with spacers, lashes or a rubber pad, for example to ensure adequate positioning. For an external auditory canal measurement in the ear, the thermometer needs to be inserted in the canal in sufficient depth. The thermometer can be further equipped for facilitating such an insertion by providing a narrow tip, or an essentially cone shape tip in the form of a, in particular detachable, head, thus providing for exactly the just insertion depth without the user risking injuring by probing it too deeply.

In a preferred embodiment, the infrared thermometer comprises at least one additional sensor in addition to the infrared sensor for recognizing if the infrared thermometer is properly positioned on said spot.

In a preferred embodiment the infrared thermometer comprises means for selecting from at least two modes of operation, each mode of operation comprising an algorithm and corresponding to one predetermined spot. The selection is done on the basis of the recognition of the spot.

In a preferred embodiment, at least one of the predetermined spot is chosen from the group consisting of the ear, in particular the external auditory canal, the head, in particular the forehead or temples, the armpit, a bodily orifice, in particular the mouth (oral cavity) or the rectum.

In a further preferred embodiment, the recognition means is an optical detection means, in particular an optical sensor capable of measuring light.

The optical sensor should preferably be able to distinguish between a light and dark environment and convert this information into an electrical signal. For this end, for example, photoresistors could be used. Alternatively photodiodes could be used.

An infrared thermometer thus equipped can distinguish between particular predetermined spots on or in a human or animal body, for example distinguish between being placed in the external auditory canal (less light detected by optical sensor) and the forehead (more light detected by optical sensor). The threshold (light/dark) can be set depending on the predetermined spots in question.

In a further preferred embodiment the recognition means is a capacitive sensor. A capacitive sensor works by measuring changes in an electrical property called capacitance. Capacitance describes how two conductive objects with a space between them respond to voltage differences. Such sensors use an alternating voltage to move the electrical charges in the target objects, thereby creating an alternating current which again is detected by the sensor. This capacitance is dependent on the proximity and the area of the object thus analysed. With that information, the infrared thermometer can be programmed to distinguish the capacitance of predetermined spots on the body, thereby recognizing if the infrared sensor is properly positioned on one of predetermined spots.

Once the presence on a predetermined spot has been recognised, the infrared thermometer can perform a specific operation. In a particular embodiment, the infrared thermometer has means for selecting from a set of preinstalled algorithms the appropriate algorithm for the specific spot for calculating and displaying a temperature or temperature profile of the body temperature. Depending on the spot on which the temperature is taken, an appropriate is selected.

In a further particular embodiment, the recognising of the proper position on the spot triggers the measurement process. Such an infrared thermometer would work automatically upon being placed on a predetermined spot. The spot will be recognised and the correct measurement routine initiated.

The thermometer may comprise a measuring adapter, said adapter being adapted for use in on at least one predetermined spot.

Such adapters can be, for example, a cap, a detachable head or a probe. The adapter is most conveniently designed such as to facilitate the bringing into contact for measurement purposes with the respective predetermined spot. A rubber pad can be used for instance for placing the thermometer on the forehead or temples, whereas an essentially cone like shape can be used for measurement on the ear, in particular the external auditory canal. Such adapters are already known in the art and are readily available.

If the same adapter or no adapter is used for numerous measurement spots, use of the wrong algorithm for temperature measurement is prevented by the means for recognising a predetermined spot.

In a further preferred embodiment, the infrared thermometer is designed to operate in a plurality of predetermined modes of operation, each of the predetermined modes of operation corresponding to at least one predetermined spot on or in a human or animal body.

Calculation of the body core temperature depends on where on the body the temperature is taken. The infrared thermometer might come equipped with algorithms to adapt the measurement profile on whether oral temperature, axial temperature or rectal temperature is taken for example. In a particularly preferred embodiment of the present invention, the infrared thermometer is equipped with at least two modes of operation, one for measurements on the head, preferably the forehead or temples, and one for measurements in the external auditory canal. Each mode of operation uses a measurement protocol, a calculation algorithm and a display and/ or notification protocol.

In a further preferred embodiment, the recognition means is dependent on temperature measurements by the infrared thermometer. In particular the recognition means may be designed to determine a temperature gradient initially measured by the thermometer and to recognize if the gradient corresponds to the gradient attributed to a specific spot.

When moved into place at a predetermined spot, the infrared thermometer measures the actual temperature several times over a time interval. The infrared thermometer then determines a profile or gradient of the individual measurements in relation to one another. By comparing the measured profile or gradient with reference data, the infrared thermometer recognizes the spot and may begin with a respective mode of operation.

One aspect of the present invention is a method of operating an infrared thermometer. The infrared thermometer is placed on or in a predetermined spot on or in a human or animal body. The infrared thermometer recognizes if moved into place at a predetermined spot. The infrared measures the temperature on the predetermined spot, and the results are displayed in readable form.

In a particular embodiment of the method, the infrared thermometer automatically recognizes if moved into place at the predetermined spot and applies a corresponding algorithm.

Preferably, the infrared thermometer starts measuring the temperature upon recognizing the predetermined spot.

DETAILED DESCRIPTION OF THE INVENTION

The present invention will now be described in further detail by means of specific examples and figures.

Figure 1:
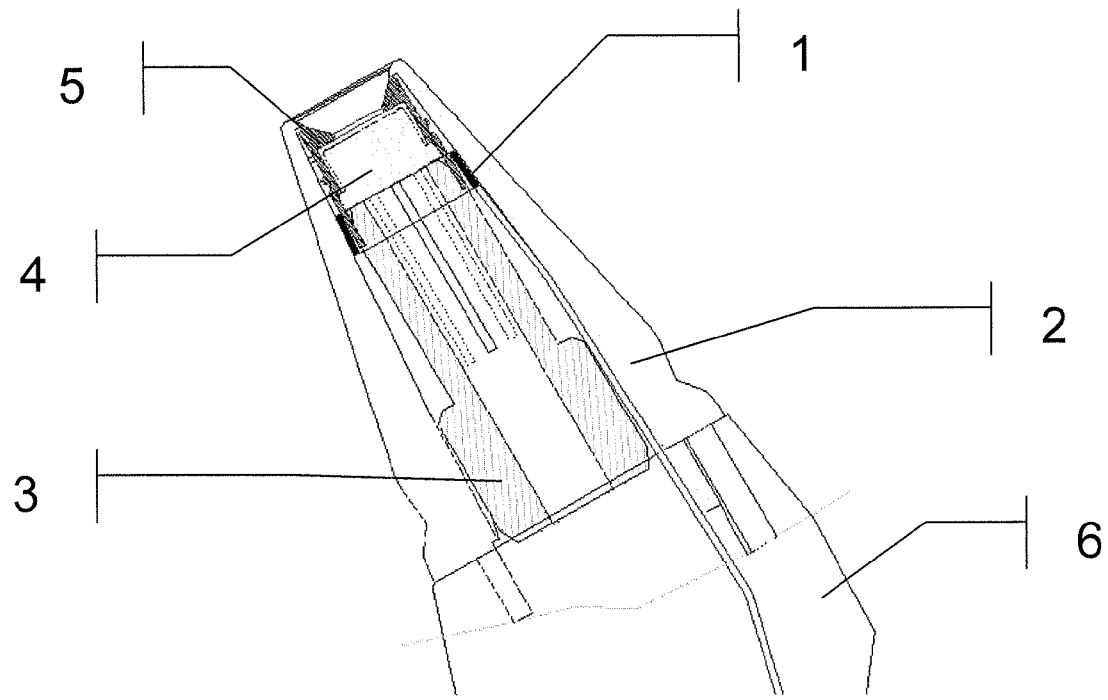
FIG. 1 shows a section of an infrared thermometer sensor head of a first embodiment.

An exemplary embodiment of the present invention is shown schematically in profile in FIG. 1. An infrared thermometer head includes a plastic probe head 2 encasing an inner structure. The inner structure comprises an infrared sensor and a recognition means for recognizing if the sensor is properly positioned. In the present embodiment, the infrared sensor is made up by a thermopile sensor 4. The thermopile sensor 4 is held in place by a thermopile sensor holder 5. An infrared radiation permeable layer of the thermopile sensor holder 5 protects the thermopile sensor 4 from dirt. The thermopile sensor holder 5 is further surrounded ring wise by a coil 1, of a capacitive sensor. The capacitive sensor consists of a probe in the form of the coil 1 and a driver (not shown). A heat sink 3 serves at dissipating heat from the thermopile and thus minimizing environmental influence on the measurement. The infrared thermometer head rests on a thermometer housing 6. Electrical conduits lead from the thermometer head to the internal (not shown) of the thermometer housing 6.

During operation the thermometer head is placed either on the forehead or introduced into the external auditory canal. Presence in the external auditory canal can be detected by the capacitive sensor through the coil 1.

Differences or peculiarities in capacitance of the skin of the forehead in relation to the external ear canal can be stored in a device memory. Once the capacitive sensor measures a capacitance, a microprocessor compares said capacitance to a bandwidth of values characteristic for said area.

In the present exemplary embodiment, which distinguishes proper placement on two predetermined spots (forehead and ear canal), it is sufficient to store only one such capacitance bandwidth.

Capacitive sensors which can be adapted and used in conjunction with the present inventions are supplied by Lion Precision (563 Shoreview Park Road, St. Paul, Minn. 55126).

Infrared radiation from either the tympanum or the forehead is translated into an electrical signal by the thermopile 4. A microprocessor in the housing translates the measured values automatically into a core body temperature and displays said value on a thermometer display (not shown).

Apart from the positioning of the thermometer, all these steps are performed automatically.

Figure 2:
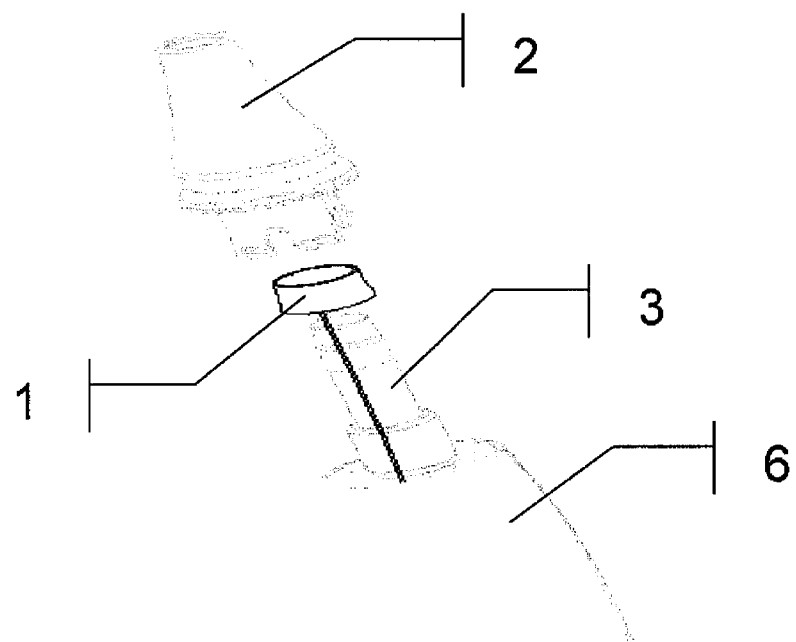
FIG. 2 shows a thermometer sensor head of the thermometer of FIG. 1 in an exploded isometric view.

FIG. 2 is an exploded isometric schematic view of a thermometer head according to this particular embodiment. The plastic probe head 2 (optionally detachable) is removed, thus revealing the inner structure. The coil 1 is a ring like structure on top of the heat sink 3. The thermopile sensor holder 5 and the thermopile sensor 4 are not shown in FIG. 2.

Figure 5:
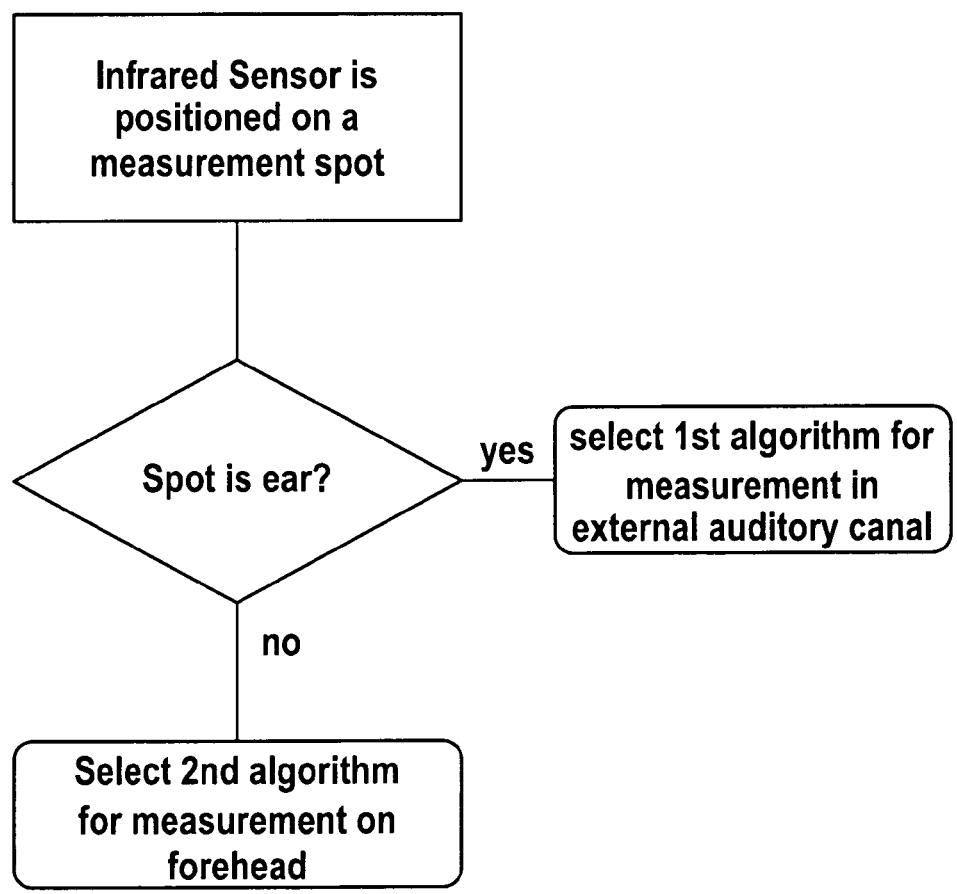
FIG. 5 shows a flowchart of the operation of the first embodiment.

The mode of operation of the first exemplary embodiment according to FIGS. 1 and 2 is illustrated in FIG. 5. The infrared thermometer is adapted to perform two different algorithms, each algorithm corresponding to either one of two predetermined spots where the thermometer can be positioned for taking the temperature. If the thermometer is placed in the ear, the capacitor sensor recognizes the spot and a first algorithm is initiated. The first algorithm is designed such as to enable calculating the core body temperature based on measurement in the external auditory canal of the ear. If instead the capacitive sensor does not detect being in the ear, then, by consequence, the thermometer must have been placed on the forehead. In this instance, a second algorithm is initiated. The second algorithm is designed such as to enable determining the core body temperature based on measurements on the forehead of the patient.

Figure 3:
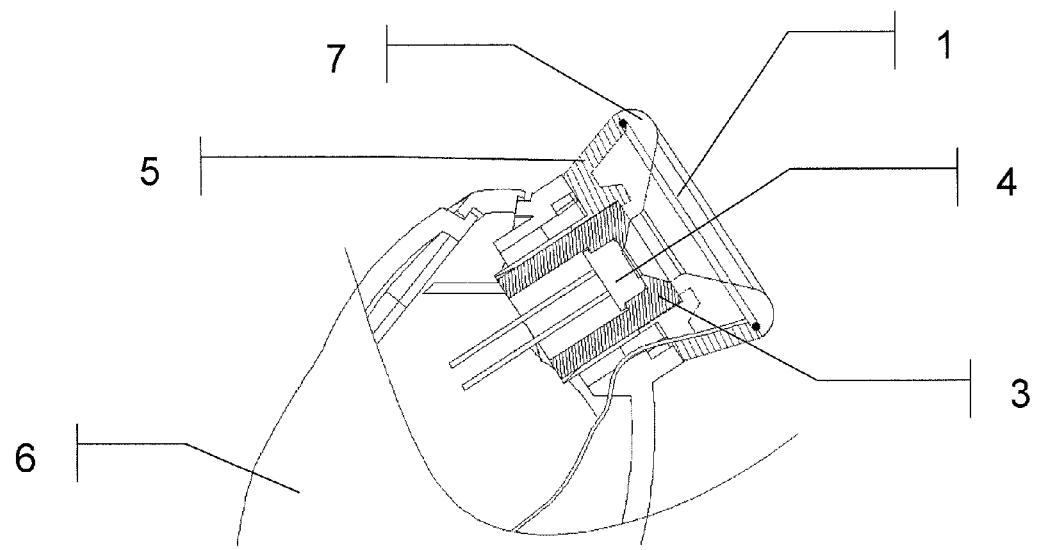
FIG. 3 shows a cross section of an infrared thermometer head of further embodiment.

A further exemplary embodiment of the present invention is shown schematically in section in FIG. 3. Shown is the head of an infrared thermometer adapted to be used on the forehead. The infrared thermometer head rests on a thermometer housing 6, which stores a microprocessor and a display. The head consists of stiff annular thermopile sensor holder 5 surrounding the inner structure and which is of an essentially isosceles trapezoid like shape with rounded edges. A rubber pad 7 is fitted onto the thermopile sensor holder 5 and is intended for contact with the forehead, where the temperature is measured. The rubber pad 7 ensures a good and neat fit on the forehead. Between the thermopile sensor holder 5 and the rubber pad 7 there is a coil 1 a capacitive sensor. The coil 1 measures variations of capacitance thus detecting and recognizing being placed on the forehead. The infrared thermometer then begins a temperature measurement.

The inner structure further comprises the thermopile sensor 4 and the insulating heat sink 3.

Figure 4:
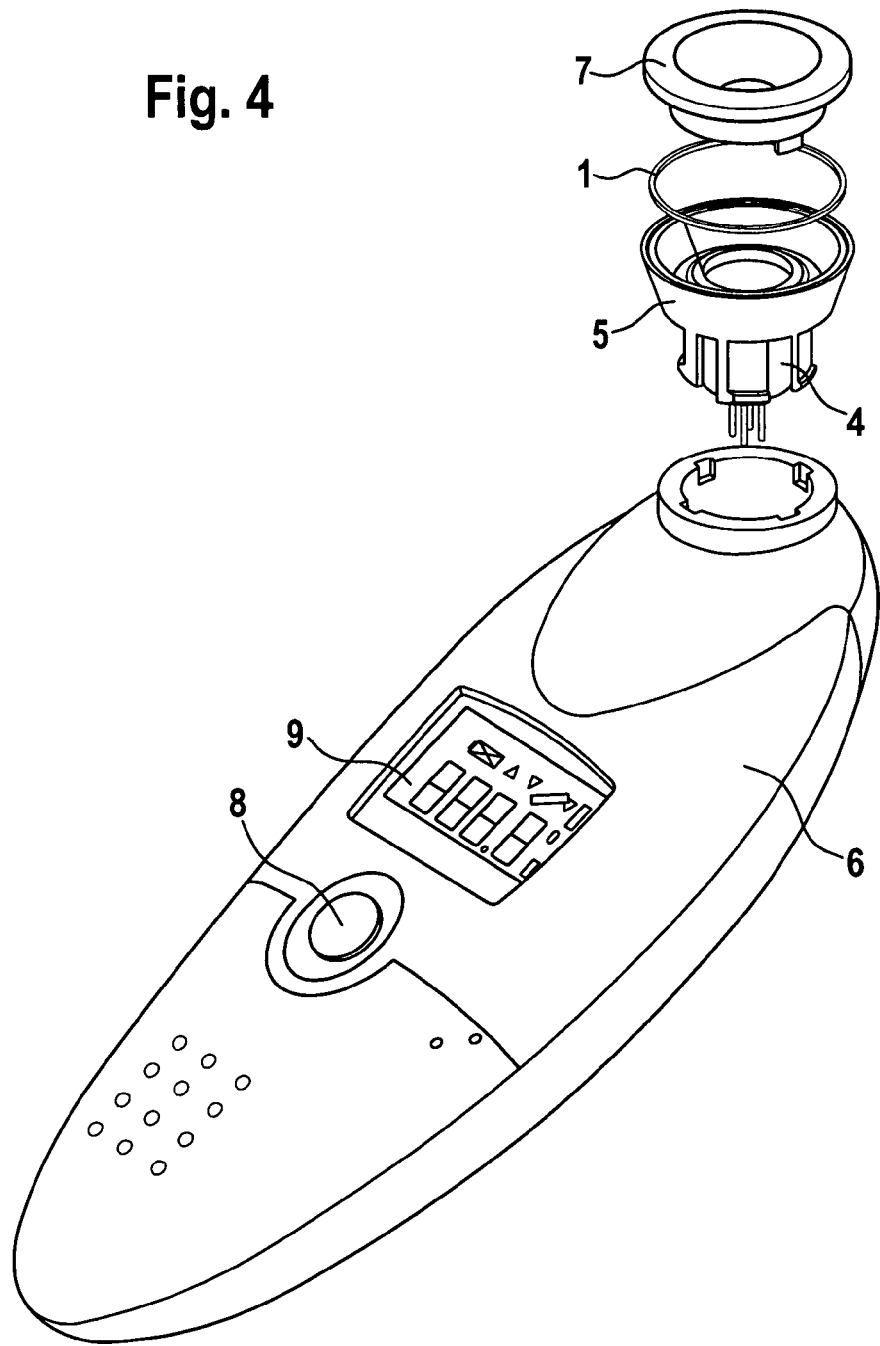
FIG. 4 shows a schematic isometric drawing of the thermometer with of FIG. 2.

The measurement signals from the coil 1 and the thermopile are utilized by the microprocessor in the housing 6. In FIG. 4 a complete infrared thermometer according to the present exemplary embodiment is shown in isometric view. The thermometer features an on/off button 8 and a graphical display 9 for displaying the temperature taken as well as optionally any kind of error message or operation instruction. The thermometer head consists of a rubber pad 7 and a coil 1 between said rubber pad 7 and the thermopile sensor holder 5. The inside of the thermopile sensor holder 5 is filled by the thermopile sensor 4.

Figure 6:
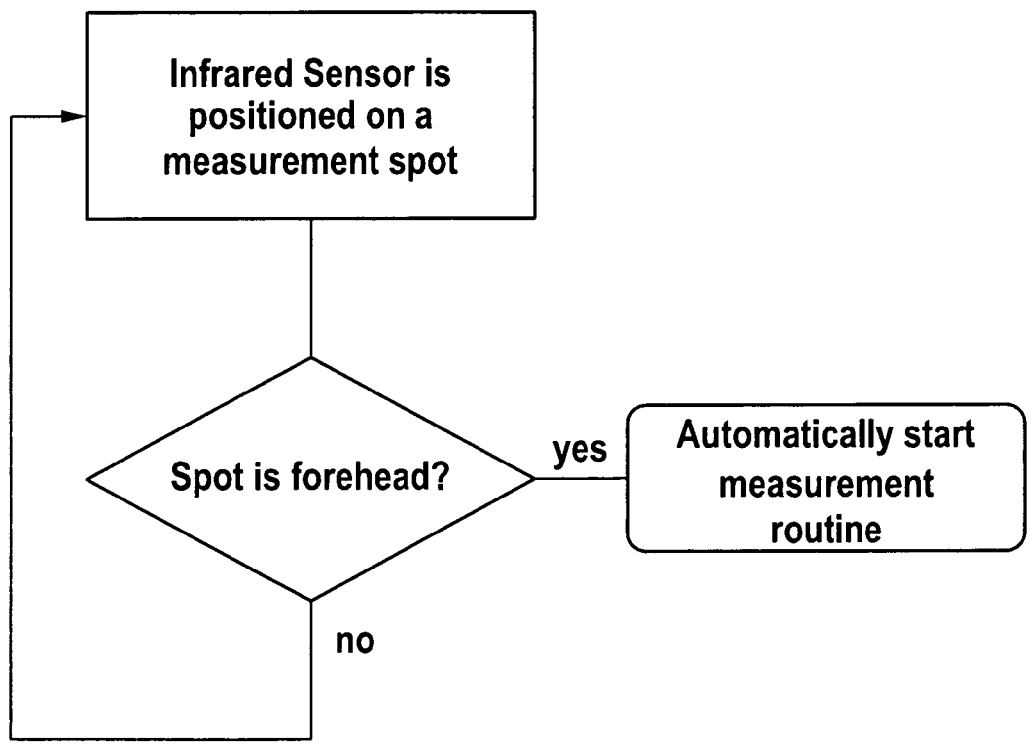
FIG. 6 shows a flowchart of the operation of the second embodiment.

The mode of operation of the second exemplary embodiment is illustrated as a flowchart in FIG. 6. The infrared thermometer is adapted to automatically start a measurement routine as soon as it is positioned on the forehead. The infrared thermometer recognises by means of the capacitive sensor whether the right position on the forehead has been taken. If that is found positive, the measurement routine is initiated. If it is found negative, the thermometer stays in stand by mode.

The invention claimed is:

1. An infrared thermometer including an infrared sensor adapted for determining a temperature of a patient based on a measurement of one or more predetermined spots on or in a human or animal body, the infrared thermometer comprising:
    a recognition means for recognizing if the infrared thermometer is properly positioned on said predetermined spots, wherein the recognition means is a capacitive sensor in the form of a coil, and
    wherein the infrared sensor comprises:
        a thermopile sensor held in place by a thermopile sensor holder, and the recognition means is disposed on and surrounds the thermopile sensor holder.

2. The infrared thermometer according to claim 1, wherein said one or more predetermined spots is chosen from the group consisting of the ear, the external auditory canal, the head, the forehead, the temples, the armpit, a bodily orifice, the mouth, or the rectum.

3. The infrared thermometer according to claim 1, wherein the recognition means is designed to recognize if the thermometer is properly positioned on the basis of a temperature profile measured by the infrared thermometer.

4. The infrared thermometer according to claim 1, wherein the infrared thermometer comprises a microprocessor capable of allocating information from the recognition means to a predetermined mode of operation.

5. An infrared thermometer including an infrared sensor adapted for determining a temperature of a patient based on a measurement of one or more predetermined spots on or in a human or animal body, the infrared thermometer comprising:
    a recognition means for recognizing if the infrared thermometer is properly positioned on said predetermined spot, the recognition means being a capacitive sensor in the form of a coil;
    a housing;
    a head resting on the housing, the head comprising a thermopile sensor holder surrounding an inner structure of the head; and
    wherein the recognition means is disposed on and surrounds the thermopile sensor holder.

6. The infrared thermometer according to claim 5, wherein the infrared thermometer comprises a rubber pad fitted onto the thermopile sensor holder, and the recognition means is provided between the thermopile sensor holder and the rubber pad.

7. The infrared thermometer according to claim 6, wherein the recognition means is designed to recognize if the thermometer is properly positioned on the basis of a temperature profile measured by the infrared thermometer.

8. The infrared thermometer according to claim 6, wherein the housing stores a microprocessor and a display, the microprocessor being capable of allocating information from the recognition means to a predetermined mode of operation.

9. The infrared thermometer according to claim 5, wherein said one or more predetermined spots is chosen from the group consisting of the ear, the external auditory canal, the head, the forehead, the temples, the armpit, a bodily orifice, the mouth, or the rectum.

10. The infrared thermometer according to claim 6, wherein said one or more predetermined spots is chosen from the group consisting of the ear, the external auditory canal, the head, the forehead, the temples, the armpit, a bodily orifice, the mouth, or the rectum.

11. The infrared thermometer according to claim 5, wherein the recognition means is designed to recognize if the thermometer is properly positioned on the basis of a temperature profile measured by the infrared thermometer.

12. The infrared thermometer according to claim 5, wherein the housing stores a microprocessor and a display, the microprocessor being capable of allocating information from the recognition means to a predetermined mode of operation.

\* \* \* \* \*